(12) United States Patent
Kosaka et al.

(10) Patent No.: US 6,434,448 B1
(45) Date of Patent: Aug. 13, 2002

(54) ROBOT CONTROLLER

(75) Inventors: Tetsuya Kosaka; Hiromitsu Takahashi, both of Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/944,090

(22) Filed: Sep. 4, 2001

(30) Foreign Application Priority Data

Sep. 4, 2000 (JP) .................................... 2000-266859

(51) Int. Cl.⁷ ............................................ G06F 19/00
(52) U.S. Cl. .................... 700/245; 700/246; 700/247; 700/248; 700/249; 700/250; 700/251; 700/254; 700/264; 318/568.11; 318/568.17; 318/568.16; 901/6; 901/9; 901/46; 701/23
(58) Field of Search .................... 700/245–251, 700/254, 264, 177, 212, 260, 257; 318/568.14, 568.11, 568.17, 561, 568.16; 901/9, 4, 49, 46; 701/23; 219/109, 86.7

(56) References Cited

U.S. PATENT DOCUMENTS

| | | | | |
|---|---|---|---|---|
| 4,831,582 A | * | 5/1989 | Miller et al. | 707/104.1 |
| 5,038,089 A | * | 8/1991 | Szakaly | 707/104.1 |
| 5,117,544 A | * | 6/1992 | Kousaku et al. | 29/27 C |
| 5,485,644 A | * | 1/1996 | Shinbara et al. | 15/21.1 |
| 5,641,415 A | * | 6/1997 | Kosaka et al. | 219/86.25 |
| 5,784,542 A | * | 7/1998 | Ohm et al. | 700/260 |
| 5,812,408 A | * | 9/1998 | Karakama et al. | 700/212 |
| 5,825,981 A | * | 10/1998 | Matsuda | 700/248 |
| 5,844,392 A | * | 12/1998 | Peurach et al. | 318/568.17 |
| 5,912,540 A | * | 6/1999 | Kosaka et al. | 318/568.14 |
| 5,980,082 A | * | 11/1999 | Watanabe et al. | 700/86 |
| 6,131,097 A | * | 10/2000 | Peurach et al. | 707/102 |
| 6,330,493 B1 | * | 12/2001 | Takahashi et al. | 7000/245 |

OTHER PUBLICATIONS

Kazerooni et al., A controller design framework for telerobotic systems, 1993 IEEE, pp. 90–32.*
Agapaki et al, Programming & control of multiple robotic devices in coordinated motion, 1990, IEEE, pp. 326–367.*

* cited by examiner

Primary Examiner—William A. Cuchlinski, Jr.
Assistant Examiner—McDieunel Marc
(74) Attorney, Agent, or Firm—Staas & Halsey LLP

(57) ABSTRACT

A robot controller for use in a robot control system with a plurality of robots connected one another through a communication path. When a cause for stopping occurs in one or more robots, other robots are also stopped in the same type of stopping procedure. A priority of execution on a plurality of stop procedure types is determined. When a cause for stopping occurs in one or more robots in the robots connected through the communication line or in the robots in synchronously cooperative operation, all of the robots connected through the communication line or the robots in synchronously cooperative operation are stopped in the same type of stopping procedure. If different causes for stopping occur in the robots, a stopping procedure type having higher priority in the stopping procedures determined in accordance with the different causes of stopping is adopted to stop all of the robots in the same type of stopping procedure. Since the robots are stopped in the same type of stopping procedure, displacement of relative positions of the robots in synchronously cooperative operation is made small.

16 Claims, 14 Drawing Sheets

|  | MASTER ROBOT | SLAVE ROBOT |
|---|---|---|
| ROBOT DEFINITION | No.1 | No.2, No.3 |

PROGRAM NAME: TRANSPORTATION

SYNCHRONISM DATA: MASTER PROGRAM

* * * * * * * * * * * * * * * * * * * * * * *

1 STRAIGHT LINE POSITION[1] 100mm/sec POSITIONING

| STOP PROCEDURE TYPE NO. | STOP PROCEDURE |
|---|---|
| 1 | DECELERATION STOP |
| 2 | CONTROLLED STOP |
| 3 | IMMEDIATE STOP |

FIG. 8

| CAUSE FOR STOP | STOP PROCEDURE TYPE NO. |
|---|---|
| INPUT OF HOLD SIGNAL | 1 |
| INPUT OF EMERGENCY STOP SIGNAL | 3 |
| OUT OF MOTION RANGE ALARAM | 1 |
| OVERHEAT ALARM | 3 |
| SEFETY FENCE OPEN | 2 |
| ... | ... |

INDEPENDENT INPUT/OUTPUT

| DI/O | STOP PROCEDURE |
|---|---|
| 1 | DECELERATION STOP |
| 2 | CONTROLLED STOP |
| 3 | IMMEDIATE STOP |

INPUT/OUTPUT OF BINARY DATA

| VALUE | STOP PROCEDURE |
|---|---|
| 1 | DECELERATION STOP |
| 2 | CONTROLLED STOP |
| 3 | IMMEDIATE STOP |

ROBOT CONTROLLER

BACKGROUND OF THE INVENTION

1. Field of the Invention

The present invention relates to a robot controller for use in a robot system in which robot controllers are connected with one another through a communication path, and more particularly to a robot controller for use in a robot system for performing a synchronously cooperative operation by a plurality of robots.

2. Description of the Related Art

There is known a robot control system in which a plurality of robot controllers are connected through a communication path for performing a synchronously cooperative operation by a plurality of robots respectively controlled by the robot controllers. In such a system, when one robot is to be stopped for a certain cause, it is necessary to stop the other robots in performing the synchronously cooperative operation. Since a plurality of robots operate in synchronous cooperation, if one robot is stopped and the other robots continues the synchronously cooperative operation, the robots may cause interferences or fail to complete a part of the operation. Therefore, in the conventional robot control system, an emergency stop signal is issued from an upper PLC (programmable logic controller) to all the robots to be stopped immediately.

There are generally known different types of methods for stopping a robot. For example, in stopping a robot for a cause of an input of a hold signal, there are known (1) a deceleration stop of stopping the robot with an execution of acceleration/deceleration processing so as not to exert an excessive load on a robot mechanism; (2) a controlled stop of stopping a robot with an execution of the acceleration/deceleration processing and also a shut off of an excitation of servo motors; and (3) an immediate stop of stopping a robot by immediately shut off servo amplifiers by an emergency stop signal.

In the above system for controlling a plurality of robots, the above method (3) of immediate stop which effects the smallest slowdown amount is adopted to minimize the relative positional displacement of the robots in stopping.

The above immediate stop, however, had better be avoided since a large load is exerted on the robot mechanism. If all of the robots in performing the synchronously cooperative operation are stopped by the method of immediate stop when one of the robots is to be stopped for a certain cause in the above robot control system, a frequency of the immediate stop of the robots is made larger to be unpreferable. Depending on a cause for stop, it is preferable to stop the robots according to the method (1) of deceleration stop or the method (2) of controlled stop.

In stopping the robots in synchronously cooperative operation, it is necessary to stop all of the robots in synchronously cooperative operation by the same method of stopping to maintain the synchronous motion since different stopping methods cause differences between motion amounts of the respective robots so that a considerable disagreement is caused on the relative positions of the stopped robots with respect to the relative positions of the robots in synchronously cooperative operation to make a problem on the robot operation. For example, in the case of transferring an object by a plurality of robots in synchronous cooperation, there is a possibility of dropping the object by the disagreement of the relative positions of the robots.

SUMMARY OF THE INVENTION

According to an aspect of the present invention, a robot controller comprises: storing means for storing assignment information on types of stopping procedure assigned for each of a plurality of causes for stopping the robot; detecting means for detecting a first cause for stopping occurred in the robot associated with the robot controller; designating means for designating a first type of stopping procedure based on the detected first cause for stopping and the assignment information stored in the storing means; sending means for sending identification information on the designated first type of stop procedure to another robot controller through the communication path; receiving means for receiving identification information on a second type of stop procedure sent from another robot controller through the communication path; and determining means for determining a type of the procedure of stopping the associated robot based on the identification information on the first type of stopping procedure or the identification information on the second type of stopping procedure.

In place of sending and receiving the identification information on the type of stop procedure, the sending means may send identification information on the detected first cause for stopping to another robot controller through the communication path, and receiving means may receive identification information on a second cause for stopping occurred in a robot associated with another robot controller sent from another robot controller through the communication path and designating a second type of stop procedure based on the assignment information stored in the storing means.

The robot controller may further comprise specifying means for specifying one or more other robots to be stopped simultaneously with the associated robot when the first cause occurs. In this case, the sending means may send identification information on the first type of stop procedure or the first cause for stopping to one or more other robot controllers of the specified one or more other robots through the communication path, and the receiving means may receive identification information on a second type of stop procedure or a second cause for stopping from the one or more other robot controllers through the communication path.

The robot controller may further comprise means for sending and receiving information for performing a synchronized or cooperative operation. through the communication path, and means for enabling the determining means only when the associated robot is in performing a synchronized or cooperative operation with another robot.

The causes for stopping the robot may include an emergency stop command inputted in the robot and an alarm occurred in the robot, and the types of stopping procedure may be classified by whether or not a power supply is shut off and/or whether or not motors for driving the robot are subjected to acceleration/deceleration processing.

BRIEF DESCRIPTION OF THE DRAWINGS

FIG. 7 is an example of assignment of stop procedure types on respective stop procedure type numbers;

FIG. 8 is an example of assignment of stop procedure type numbers on respective causes for stop procedure;

DETAILED DESCRIPTION OF THE PREFERRED EMBODIMENTS

Figure 1:
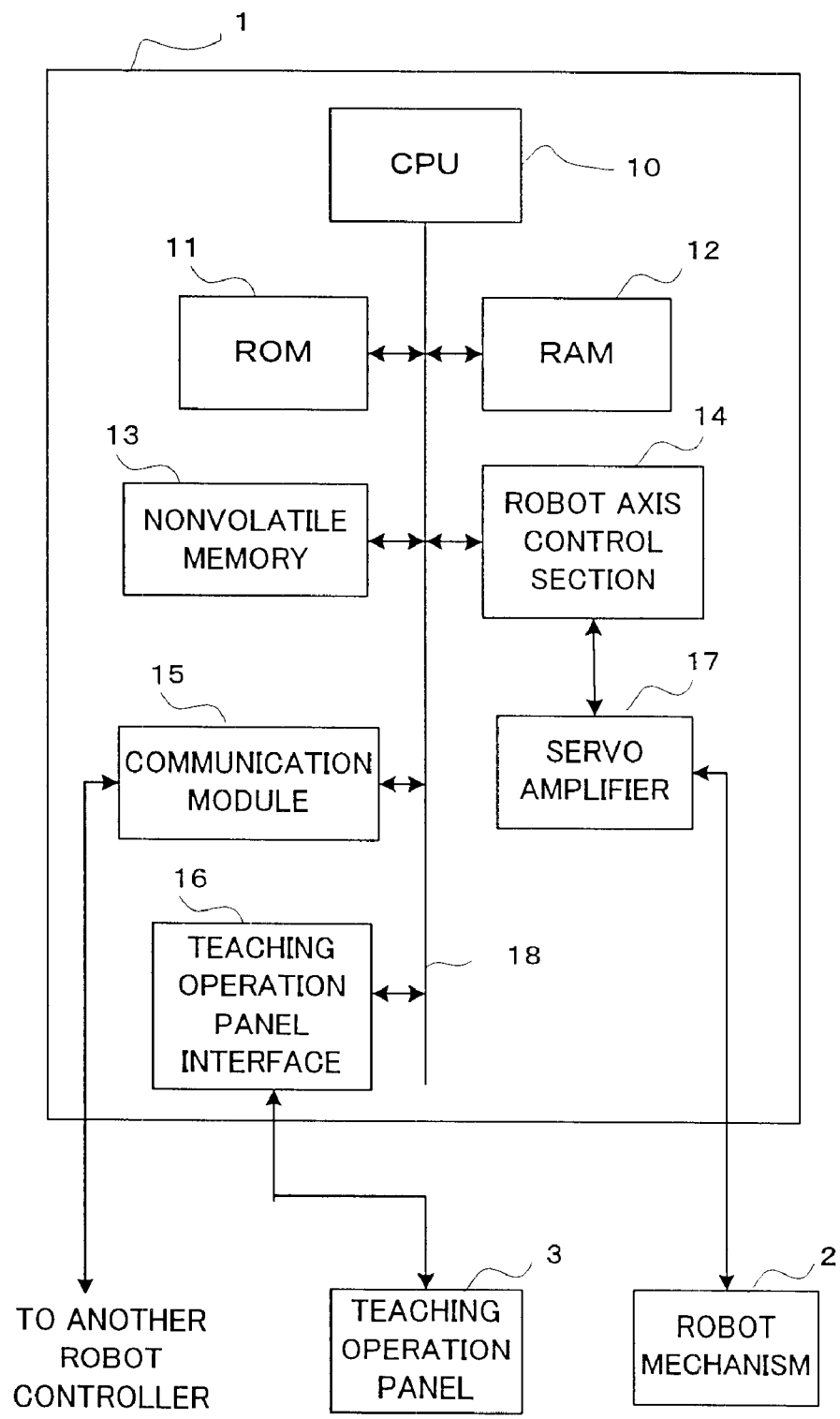
FIG. 1 is a block diagram of an essential part of a robot including a robot controller for controlling an associated robot according to an embodiment of the present invention.

FIG. 1 shows a robot controller for controlling each associated robot for use in a robot system in which a plurality of robot controllers are connected with one another through a communication path designed for a synchronously cooperative operation.

In FIG. 1, a robot controller 1 has a processor 10 for generally controlling a robot mechanism 2 and the robot controller 1. The processor 10 is connected with a ROM 11, a RAM 12, a nonvolatile memory 13, a robot axis control section 14, a communication module 15, a teaching panel interface 16, etc. via a bus 18. The ROM 11 stores a system program to be executed by the processor 10, and the nonvolatile memory 13 stores set values of various parameters and a taught program for an operation to be performed by the robot mechanism 2. The RAM 12 is used for temporarily storage of data. The robot axis control section 14 performs feedback controls of position, velocity and torque (current) of each motor for each axis by the digital servo control using a processor based on motion commands fro each axis, to drive the servomotor for each axis of the robot mechanism section 2 via a servo amplifier 17. The communication module 15 is connected to another robot controller by a communication path. The teaching operation panel interface 16 is connected with a teaching operation panel 3.

The above basic configuration of each robot controller 1 is the same as that of the conventional one, and the robot controllers of such configuration are connected to one another via a signal path of communication lines, to constitute a robot control system for a synchronously cooperative operation of a plurality of robots.

The following is a description on a robot control system for controlling four robots by the robot controllers connected by the signal path for respectively controlling the associated robots, to sequentially perform individual operations and a synchronously cooperative operation of the robots in an arbitrary combination.

Figure 2:
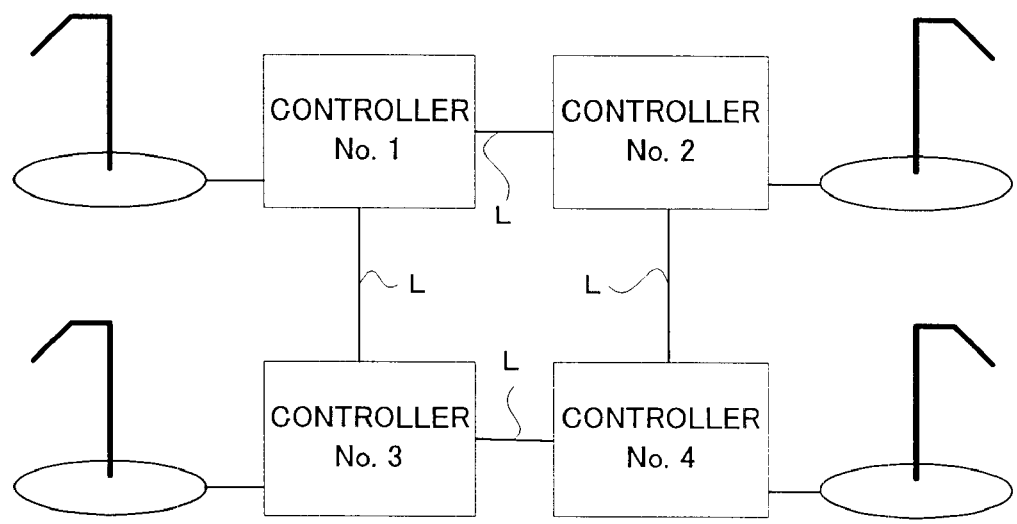
FIG. 2 is a schematic diagram showing an example of a robot system with a plurality of robots connected by a communication line using a plurality of robot controllers as shown in FIG. 1.
Figure 3:
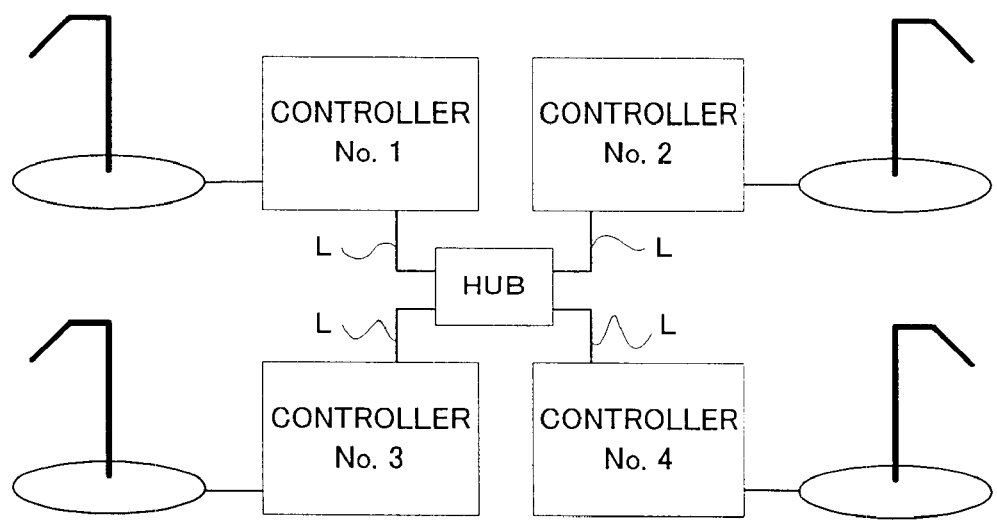
FIG. 3 is a schematic view showing another example of a robot system with a plurality of robots connected by a communication line using a plurality of robot controllers as shown in FIG. 1.

FIGS. 2 and 3 show examples of connection of the four robot controllers connected by a communication network of Ethernet. Any network other than Ethernet may be used. In an example of FIG. 2, the robot controllers No. 1 to No. 4 are connected to one another by signal lines L to form a signal path. In the example of FIG. 3, the robot controllers Nos. 1–4 are connected to one another by using a hub. To identify each robot connected by the communication lines L, each robot number is applied to each robot, and in the nonvolatile memory of each robot, the robot number assigned to that robot is set and stored. In the examples shown in FIGS. 2 and 3, the number of No. 1 to No. 4 are set and stored. In the following description, No. 1 to No. 4 are used for robot No. 1 to No. 4 and robot controller No. 1 to No. 4. Also, robots No. 1 to No. 4 are used.

A transformation matrix from each robot to another robot is set by calibrating the installation position between the robots in construction of the robot control system. For example, when the robot No. 2 is viewed from the robot No. 1, it is necessary to determine a position in a world coordinate system of the robot No. 1 at which a world coordinate system of the robot No. 2 lies. For this purpose, for example, a transformation matrix $T_{2-1}$ from the world coordinate system of the robot No. 1 to the world coordinate system of the robot No. 2 is determined. This is done for all patterns. However, since the inverse matrix of the transformation matrix $T_{2-1}$ from No. 1 to No. 2 is the transformation matrix from No. 2 to No. 1, when the transformation matrix from No. 1 to No. 2 is determined, it is unnecessary to determine the transformation matrix from No. 2 to No. 1. The transformation matrix thus determined is stored in the nonvolatile memory 13 of each robot controller. For example, the transformation matrix $T_{1-2}$ from No. 2 to No. 1 is stored in the controller of the robot No. 2. Similarly, each transformation matrix is stored in the nonvolatile memory 13 of each robot controller, for example, the transformation matrix $T_{1-3}$ from No. 3 to No. 1 is stored in the robot controller No. 3, the transformation matrix $T_{1-4}$ from No. 4 to No. 1 is stored in the robot controller No. 4, and the transformation matrix $T_{2-3}$ is stored in the robot controller No. 3.

In the calibration method, as having been carried out so far, a calibration rod is attached to wrists of two robots to be calibrated, and a distal end thereof is set so as to be a TCP (tool center point). Then, the distal ends of the calibration rods are positioned at three points (a triangle is formed with the three points being the vertexes) in a space that do not lie on the same straight line, and the positions are determined by the respective world ordinate system. Thereafter, the transformation matrix $T_{2-1}$ from the robot No. 1 to the robot No. 2 is calculated from the determined three position data on the world coordinate system of the robot No. 1 and three position data on the world coordinate system of No. 2. Similarly, each transformation matrix is determined, and is stored in the nonvolatile memory of each robot controller.

Figures 4, 5, 6:
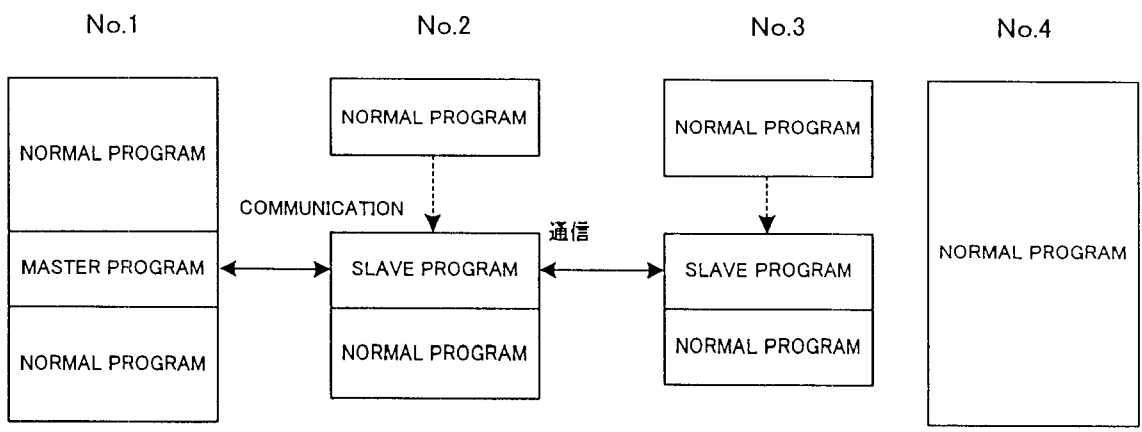
FIG. 4 is a diagram of a setting example of definition information on master and slave robots for performing a synchronously cooperative operation.
FIG. 5 is an example of definition information on a master robot set in a master program.
FIG. 6 is a diagram of an execution sequence of operation programs for respective robots.
Figure 9:
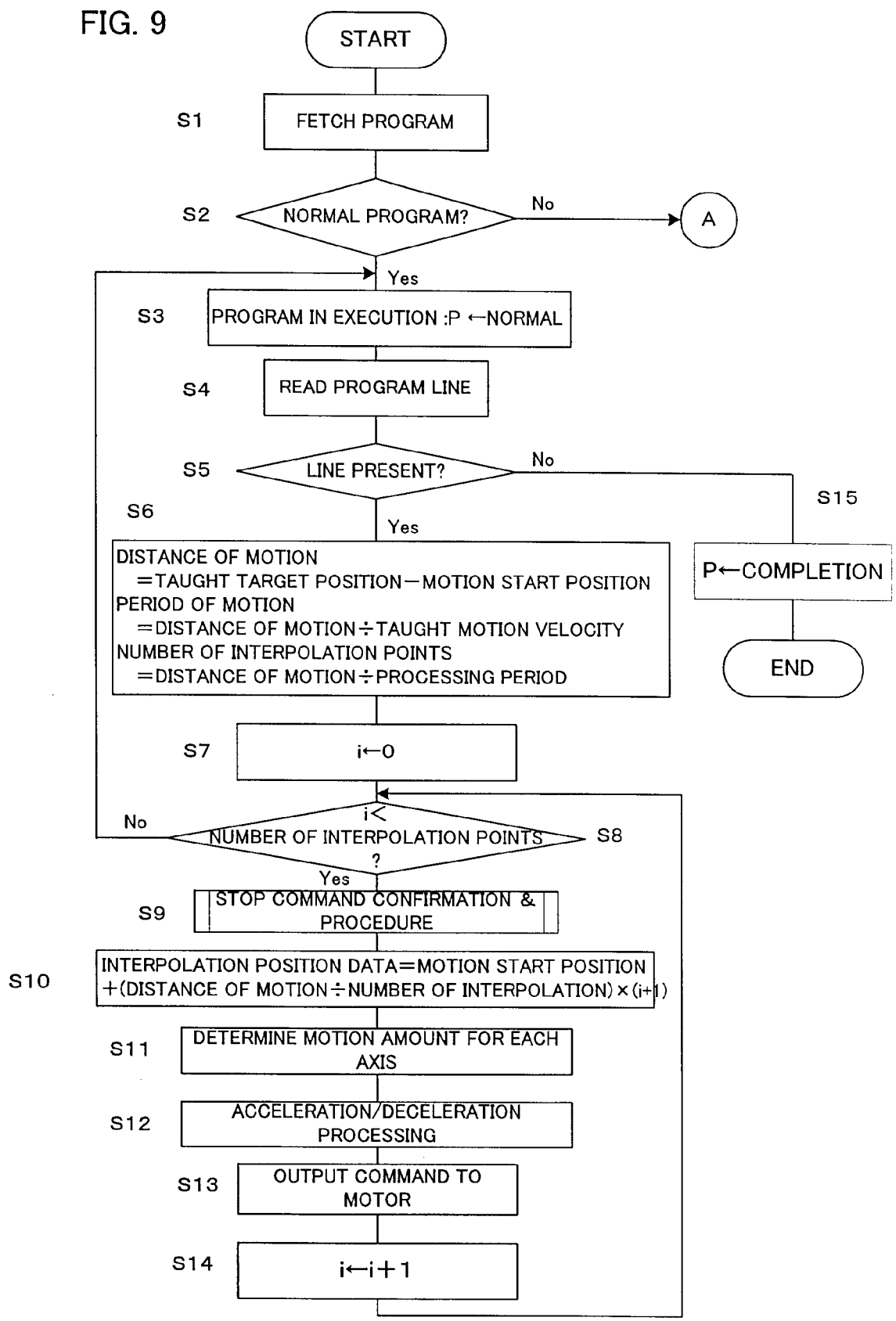
FIG. 9 is a partial flowchart of processing to be executed by the processor of each robot controller, which is mainly a flowchart of processing to be performed by the robot controller for the robot to operate independently (execution of a normal program)
Figure 10:
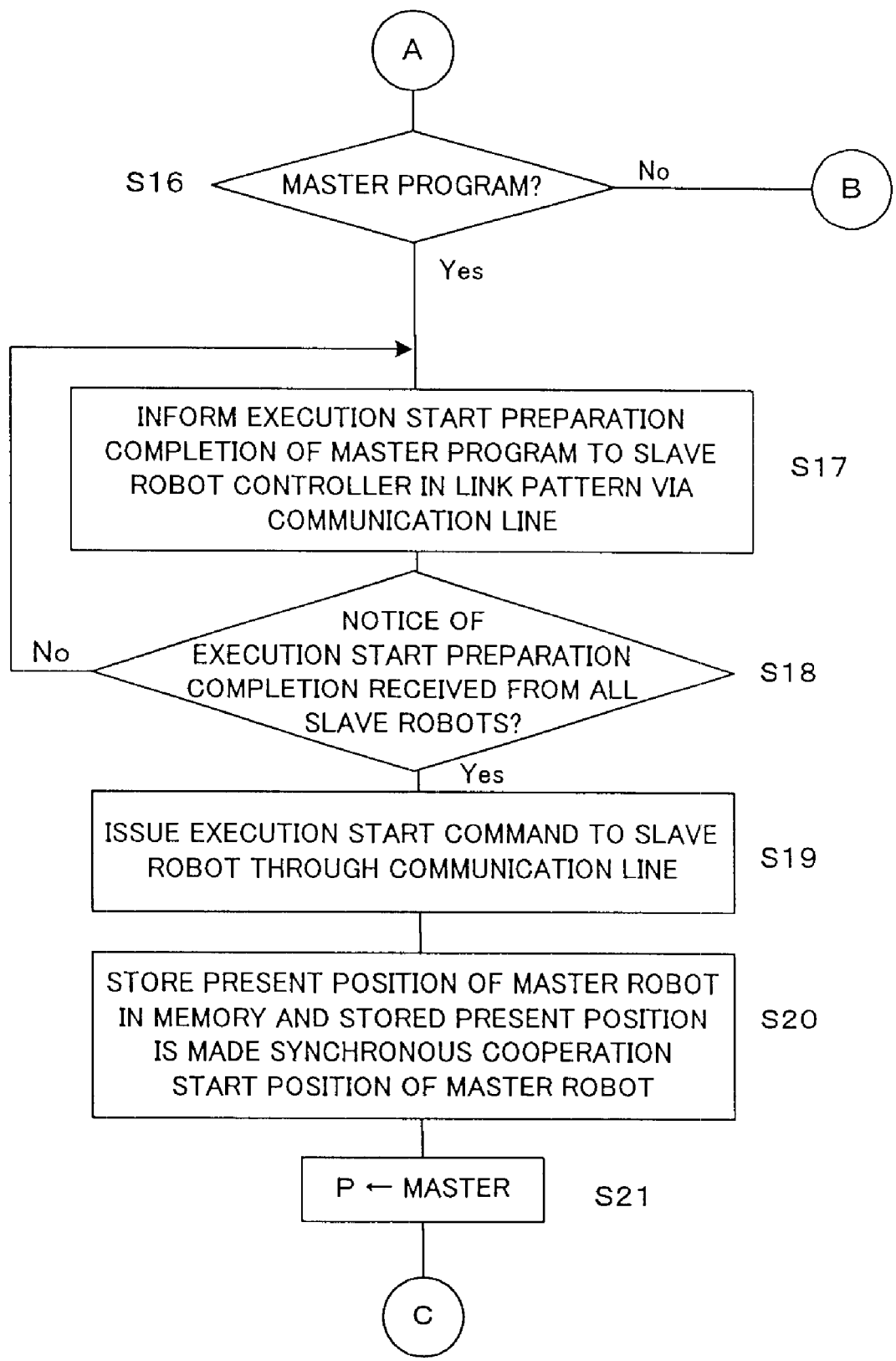
FIG. 10 is a continuation of the flowchart of FIG. 9, which is a part to be executed by the processor of a master robot controller (execution of a master program)
Figure 11:
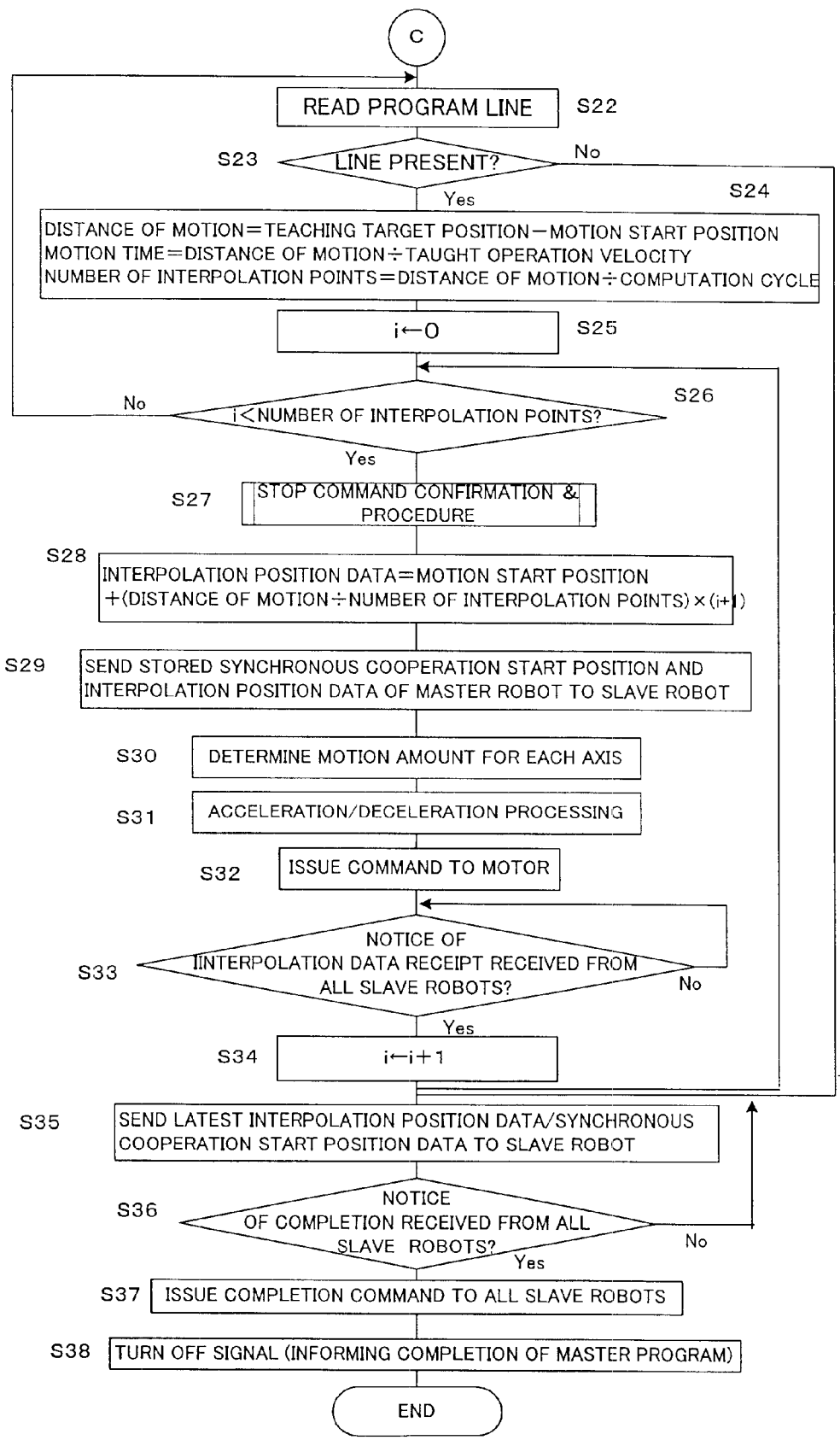
FIG. 11 is a continuation of the flowchart of FIG. 10 to be executed by the processor of the master robot controller (execution of the master program)
Figure 12:
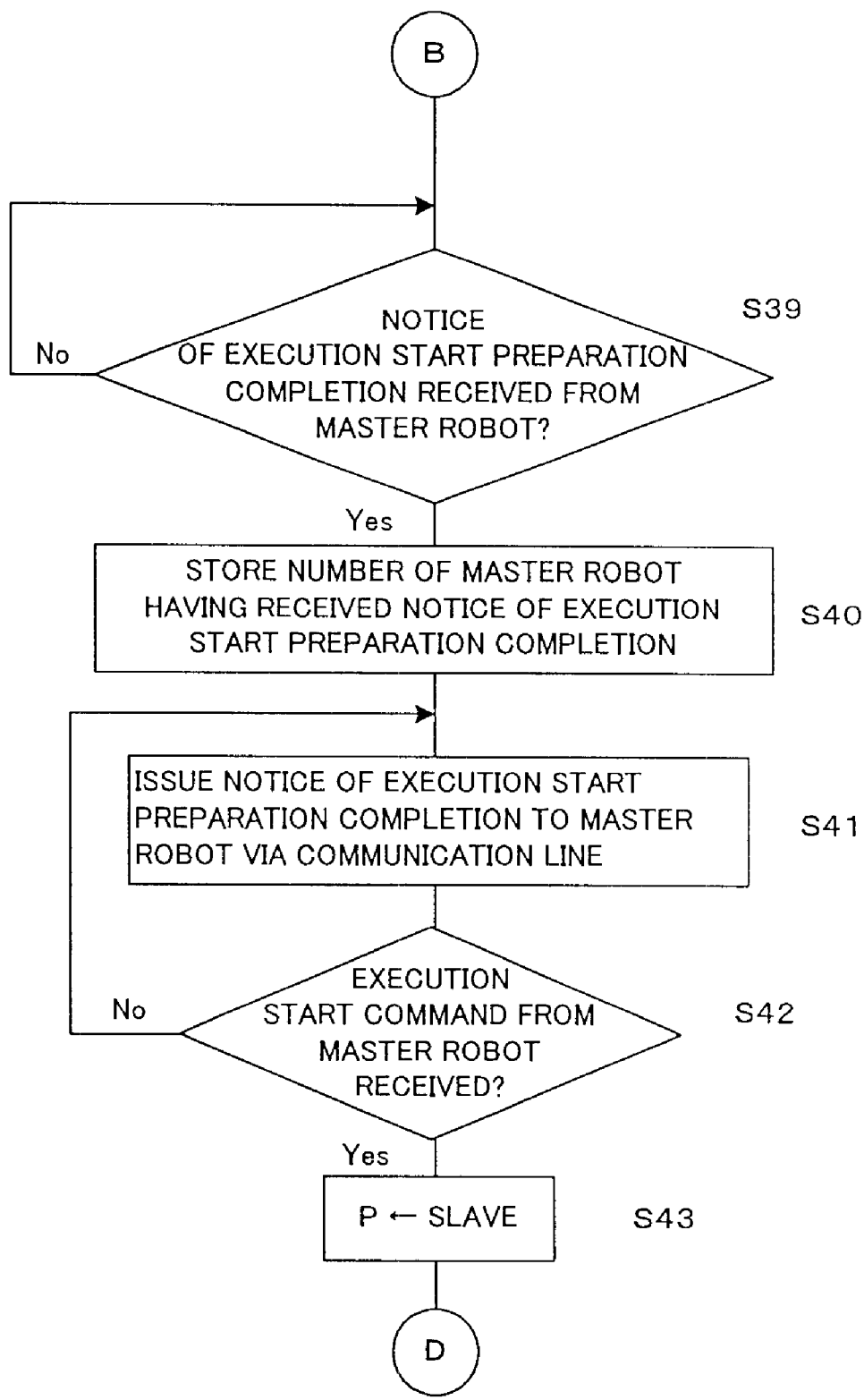
FIG. 12 is a continuation of the flowchart of FIG. 10, which is a part of to be executed by a slave robot controller (execution of a slave program)
Figure 13:
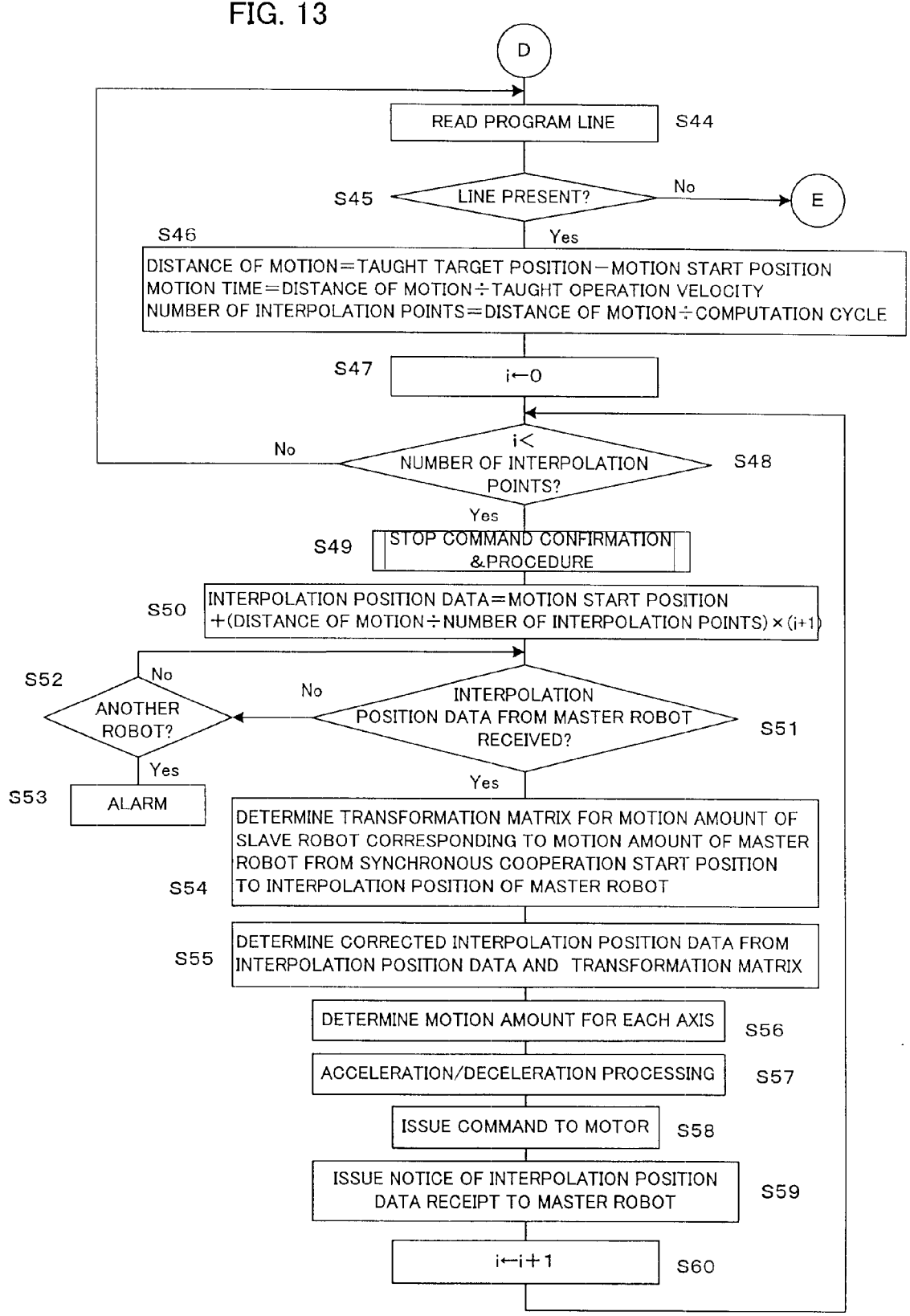
FIG. 13 is a continuation of the flowchart of FIG. 12 to be executed by the slave robot controller (execution of the slave program)
Figure 14:
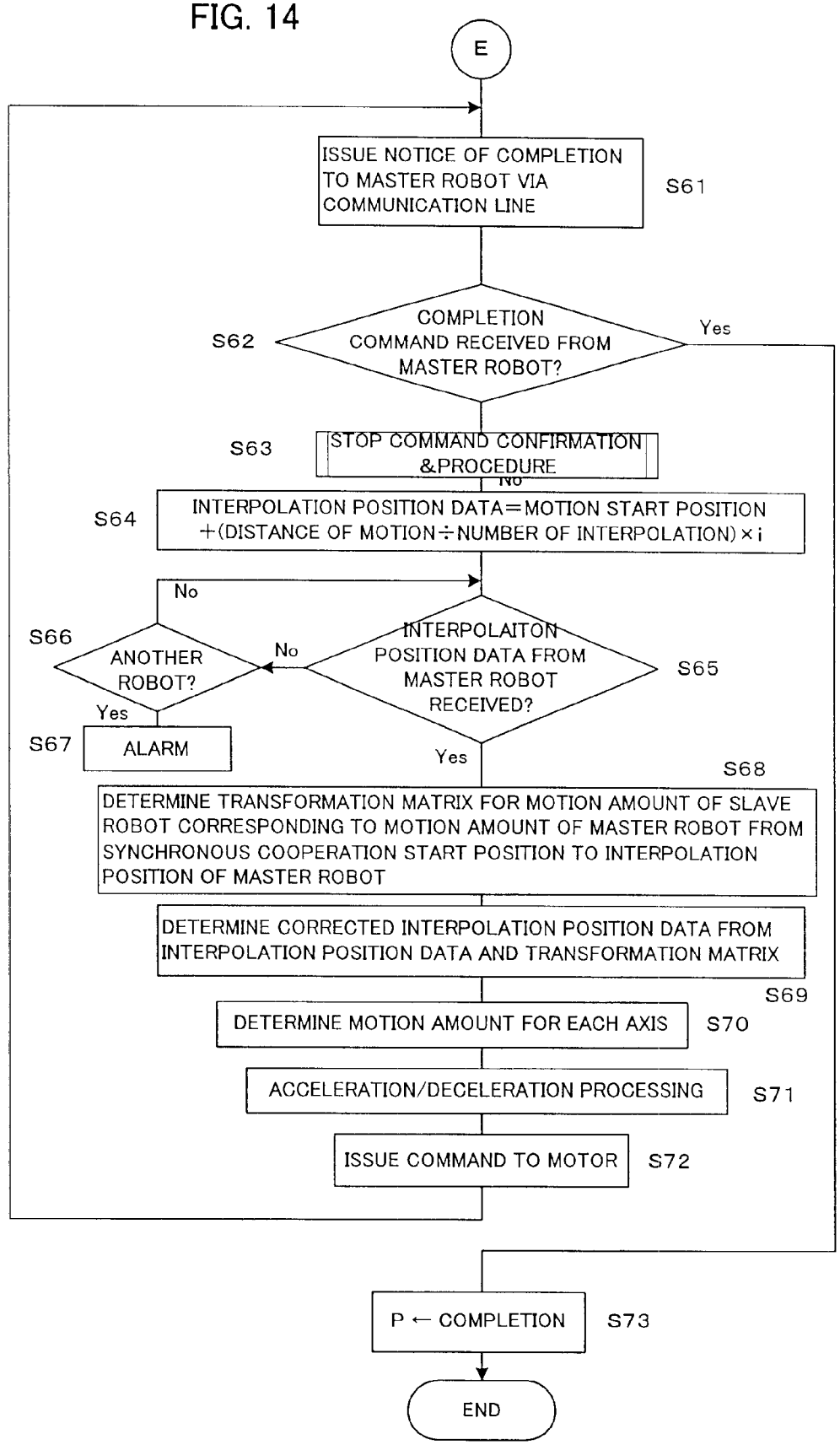
FIG. 14 is a continuation of the flowchart of FIG. 13 to be executed by the slave robot (execution of the slave program)

A combination of robots to be synchronously operated for cooperation are determined, and a master robot and one or more slave robots in the combination are designated in the robot control system as shown in FIGS. 2 and 3. FIG. 4 shows an example of designation information of master and slave robots. The robots Nos. 1–3 are designated to cooperate in synchronism with the robot No. 1 used as a master robot and the robots Nos. 2–4 used as slave robots.

The robot No. 4 which is not designated as a master robot or slave robots may be used as normal robots, that is, they are operable independently while the master robot and the slave robots perform the synchronously cooperative operation.

The combination of the robots to be operated in synchronously cooperation are defined arbitrarily and the designation of master and slave robots in the combination is arbitrary. In the combination of the robots for synchronously cooperative operation, one robot is selected to be a master robot, and one or more robots are selected to be slave robots among the rest of the robots connected by the communication line L.

The definition of the combination of the master and slave robots is set in operation programs to be executed by respective robot controllers. FIG. 5 shows an example of an operation program to be executed by a robot controller for controlling a master robot. In this operation program, "MASTER PROGRAM" is set as a synchronous operation data. The data "SLAVE PROGRAM" is set in an operation program to be executed by a robot controller for controlling a slave robot. The data "NORMAL PROGRAM" is set in an operation program to be executed by a robot controller for controlling a normal robot.

A sequence of execution of the operation programs is determined for each robot controller. FIG. 6 shows an example of the execution sequences of the operation programs for respective robot controllers. For the robot No. 1, a normal program, a master program and a normal program are set to be executed sequentially. For the robots Nos. 2 and 3, a normal program, a slave program and a normal program are set to be executed sequentially. For the robot No. 4, only a normal program is set to be executed.

According to the example shown in FIG. 6, the following operation is performed.

(1) First, all the robot controllers execute normal programs to operate the robots No. 1 to No. 4 independently (2) The robot controller for the robot No. 1 executes the master program and the robot controllers for the robots Nos. 2 and 3 execute the slave programs to perform a synchronously cooperative operation after completion of execution of the foregoing normal programs (3) The robot controllers for the robots Nos. 1–3 execute the normal programs after completion of the synchronously cooperative operation (4) The robot controller for the robot No. 4 executes the normal program irrespective of the operations of the other robots Nos. 1–3.

In the nonvolatile memory 13 of the robot controller for each of the robots Nos. 1–4, stop procedure type numbers each representing a type of stop procedure to be performed in each robot controller are set and stored, as shown in FIG. 7, and a table of designation of the stop procedure type number for each of causes of stops. In the example shown in FIGS. 7 and 8, the stop procedure type No. 1 is assigned to a cause of manual input of a hold signal and a cause of issuance of an alarm indicating deviation from operation area to adopt the deceleration stop. The stop procedure type No. 3 is assigned to input of the emergency stop signal and an alarm of overheat to immediately stop the robot operation. The stop procedure type No. 2 is assigned to input of a signal indicating an open of safety fence to perform the controlled stop. The stop procedures have priority of execution. In this example, the larger number is assigned to the stop procedure having higher priority.

Thus, after each program is stored in the nonvolatile memory 13 of each robot controller, the program is started to be executed. Then, the processor 10 of each robot controller 1 starts processing shown in a flowchart of FIGS. 9 to 16.

First, the stored program is read (Step S1), and it is determined whether the read program is a normal program or not (Step S2). In the above-described example, since each robot reads a normal program as shown in FIG. 6, the procedure proceeds to Step S3 where information indicating "normal program" is set in a resister P. Then, the next program line is read (Step S4) and it is determined whether the line is present or not (Step S5). If the line is present, the motion start position (present position) on that line is subtracted from the taught target position (TCP position) programmed on that line to determine a distance of motion, and further the distance is divided by a taught operation velocity to determine a motion time. Also, the motion time is divided by a computation period of interpolation to determine the number of interpolation points (Step S6).

Next, an index i is set at "0" (Step S6), and it is determined whether or not the index i is smaller than the number of interpolation points determined in Step S6 (Step S8). If the index i is smaller than the number of interpolation points, the procedure proceeds to Step S9 where it is determined whether or not a stop procedure request is issued and a stop procedure is performed, if the stop procedure request is issued (Step S9). If the stop procedure request is not issued, the distance of motion determined in Step S6 is divided by the number of interpolation points and the quotient is multiplied by the sum (i+1) of the index i and "1", and then the obtained value is added to the motion start position on that line, to obtain interpolation position data (Step S10).

A motion amount (incremental amount) of each-axis is determined based on this interpolation data (Step S11), the motion amount of each axis is subjected to acceleration/deceleration processing (Step S12) and commanded to a motor (Step S13). Specifically, a motion command value of each axis, which has been subjected to acceleration/deceleration processing, is output to the axis control section 14 of the robot, loop control for position, velocity, current, etc. is carried out, and a servomotor for each axis of the robot mechanism section 2 is driven via the servo amplifier 17.

Next, the index i is increased by "1" (Step S14), and the procedure returns to Step S7 to repeatedly execute the processing in Steps S8 through S14 until the index i reaches the number of interpolation points. When the index i reaches the number of interpolation points, the procedure proceeds from Step S8 to Step S3 where the next program line is read.

The processing in Step S3 and the subsequent steps is executed repeatedly until the read line becomes absent. If the line becomes absent, the processing of this normal program is completed.

Then, the next program is read, and it is determined whether the program is a normal program or not (Steps S1 and S2). In the example shown in FIG. 6, the master program is read for the robot No. 1, and the slave program is read for the robots Nos. 2 and 3. The robot No. 4 continues the operation according to the normal program until the normal program terminates.

The procedure in the controllers of the robots No. 1–3 proceeds from Step S2 to Step S16, where it is determined whether the read program is a master program or not. Since the controller of the robot No. 1 reads the master program, the processing of Steps S17 through S38 is started. Since the controllers of the robots No. 1–3 read the slave program, the procedure proceeds from Step S16 to Step S39.

The processor 10 of the controller of the robot No. 1, which functions as a master robot controller, issues a notice of execution start preparation completion of the master program to the slave robots through the communication line L, referring to the definition of master and slave robot as shown in FIG. 4 (Step S17), and determines whether or not notices of execution start preparation completion have been received from all notified slave robots (Step S18). The processing of Steps S17 and S18 is executed repeatedly until the notices are received.

On the other hand, the processor of the slave robot controller determines whether or not a notice of execution start preparation completion has been received from the master robot (Step S39) and waits until the notice is received. When the notice has been received, the number of the master robot from which the notice of execution start preparation completion is received is stored in the nonvolatile memory 13 (Step S40), and a notice of execution start preparation completion of the slave robot is issued to the master robot via the signal line L (Step S41). The processing of Steps S41 and S42 is executed repeatedly until an execution start command is received from the master robot.

Thus, the notice of execution start preparation completion is exchanged between the master robot and the slave robots. When the master robot receives the notices of execution start preparation completion from all the slave robots (Step S18), the execution start command is issued to all the slave robots (Step S19).

When the normal and independent operation of each robot is first performed and then the synchronously cooperative operation is performed with the robots Nos. 1–3 as shown in FIG. 6, even if the master robot finishes the execution of the normal program and reads the next master program, the synchronously cooperative operation is not started until the notices of execution start preparation completion are received from all the slave robots. Also, unless the slave robot finishes the execution of the preceding normal program, the slave robot does not perform the processing of Steps S1, S2, S16, S39, and naturally, it does not issue the notice of execution start preparation completion to the master robot in Step S41. Therefore, the next synchronously cooperative operation is not executed until all the robots finish the processing of the respective normal programs.

Inversely, even when the processing of the normal program of the master robot completes latest, the notice of execution start preparation completion is not issued from the master robot to each of the slave robots, so that the subsequent synchronously cooperative operation is not started until the master robot completes the processing of the normal program and all the robots complete the preceding normal operations.

When in the robots in which the synchronously cooperative operation is executed, the operations of all the robots that have been performed before the execution of synchronously cooperative operation have been finished, and the master robot has received the notice of execution start preparation completion from all the slave robots (in this case, robots No. 2 to No. 4) in Step S18, the processor of the master robot issues the execution start command to the slave robots (Step S19). The processor of the master robot stores the present position in the nonvolatile memory 13 as a start position of a synchronously cooperative operation (Step S20), and stores information indicating midst of execution of the master program in a register P (Step S21). Then, the next line of the program is read (Step S22) and the processing in Steps S23 through S26, which is the same as the above-described processing in Steps S5 through S8. Specifically, if a programmed line is present, the distance of motion, the motion time and the number of interpolation points are determined, and the index i is set to "0". If the index i is smaller than the number of interpolation points, the processing of the "stop command confirmation and procedure", which is the same processing as Step S9, is executed (Step S27). If a stop procedure command is not issued, the processing of Step S28, which is the same as the above-described processing of Step S8, is executed to obtain the interpolation position data. That is, the interpolation position data is obtained by performing the following computation.

Interpolation position data=motion start position of that line+(distance of motion÷number of interpolation points)×(i+1)

The processor of the master robot sends the stored synchronously cooperative operation start position of the master robot and the interpolation position data obtained in Step S28 to all the slave robots through the communication line L (Step S29), determines the motion amount (incremental amount) on each axis based on the interpolation position data obtained in Step S28, which is the same processing as that of Steps S11, S12 and S13, and performs acceleration/deceleration processing to issue commands to the motors (Steps S30, S31 and S32). Subsequently, the master robot waits until notices of interpolation position data receipt completion are sent from all the slave robots (Step S33).

On the other hand, when the processor of the slave robot receives, in Step S42, the execution start command issued by the processor of the master robot in the processing in Step S19, the processor of the slave robot stores information indicating midst of execution of the slave program in the register P (Step S43), and executes the same processing as that of Steps S22 through S26. Specifically, the next line of the slave program is read, and if the line is present, the distance of motion, the motion time and the number of interpolation points by this line are determined, the index i is set to "0", and it is determined whether or not the index i is smaller than the number of interpolation points (Steps S44 through S48). If the index i is smaller than the number of interpolation points, the same processing as the above-described processing of Steps S9 and S10 is performed. Specifically, the stop confirmation and procedure is executed (Step SB49) and if a stop procedure command is not issued, the distance of motion obtained in Step S46 is divided by the number of interpolation points and the quotient is multiplied by a value obtained by adding 1 to the index i, and then the obtained sum is added to the motion start position on that line, to determine the interpolation position data (Step S50).

Then, the controller of the slave robot waits until the interpolation position data and the synchronously cooperative operation start position data from the master robot are received (Step S51). If the received interpolation position data is not the data from the master robot identified by the robot number stored in Step S40 (Step S48), the slave robot issues an alarm and stops (Step S53). On the other hand, if the interpolation position data and the synchronously cooperative operation start position data send in Step S26 from the master robot identified by the robot number are received, the processor of the slave robot determines a transformation matrix to the motion amount of slave robot for the motion amount of the master robot based on the received synchronously cooperative operation start position data and interpolation position data (Step S54), and determines corrected interpolation position data of the slave robot taking the motion amount of the master robot into consideration based on the determined transformation matrix and the interpolation position data of the slave robot obtained in Step S50 (Step S55).

A method of determining the corrected interpolation position data of the slave robot taking the motion amount of master robot into consideration will be described with reference to FIG. 17.

P0: an arbitrary position in the space

P1: an arbitrary position in the space, which is different from P0

P0s: a position at which P0 is viewed from the world coordinate system of slave robot P1s: a position at which P1 is viewed from the world coordinate system of slave robot P0m: a position at which P0 is viewed from the world coordinate system of master robot P1m: a position at which P1 is viewed from the world coordinate system of master robot Ts-m: a transformation matrix in the case where the world coordinate system of master robot is viewed from the world coordinate system of slave robot T0s-1s: a transformation matrix from P0s to P1s in the world coordinate system of slave robot in the case of being viewed from a slave robot $$P1s = T0s\text{-}1s | P0s \quad (1)$$

$$P1s = Ts\text{-}m | P1m \quad (2)$$

$$P0s = Ts\text{-}m | P0m \quad (3)$$

From Equations (1), (2) and (3), $$Ts\text{-}m | P1m = T0s\text{-}1s | Ts\text{-}m | P0m \quad (4)$$

Therefore, $$T0s\text{-}1s = Ts\text{-}m | P1m | INV(Ts\text{-}m | P0m) \quad (5)$$

where, INV means an inverse matrix.

In Equation (5), Ts-m is a transformation matrix in the case where the world coordinate system of master robot is viewed from the world coordinate system of slave robot (in the case where the master robot is the robot No. 1 and the slave robot is the robot No. 2, this transformation matrix Ts-m is $T_{1\text{-}2}$), and it is set and stored in the nonvolatile memory of the slave robot by the calibration made first. Also, by making the calculation in Equation (5) taking P0m as the synchronously cooperative operation start position sent from the master robot and P1m as the master robot interpolation position sent from the master robot, the transformation matrix T0s-1s for determining the motion amount in the world coordinate system of slave robot corresponding to the motion amount of master robot can be determined.

As shown in the following equation, by multiplying the determined transformation matrix T0s-1s by the interpolation position data of slave robot determined in Step S49, the interpolation position data of slave robot which the motion amount of master robot is reflected on (added to) can be obtained.

Interpolation position data of slave robot on which motion amount of master robot is reflected=T0s-1s| interpolation position data of the slave robot.

Based on the interpolation position data thus corrected, the motion amount on each axis is determined (Step S56), acceleration/deceleration processing is performed (Step S57), and a command is issued to the motor (Step S58). Then, a notice of interpolation position data receipt is sent to the master robot (Step S59), the index i is increased by "1" (Step S60), and the processing returns to Step S48.

The processing of Steps S48 through S60 is executed repeatedly until the index i reaches the number of interpolation points.

On the other hand, when it is determined in Step S33 that the master robot controller has received the notices of interpolation position data receipt, which are sent by the processors of respective slave robots in the processing of Step S58, from all the slave robot controllers, the index i is increased by □1" (Step S34), and the processing returns to Step S26 to repeatedly execute the processing of Steps S26 through S34 until the index i reaches the number of interpolation points.

If the index i reaches the number of interpolation points, the procedure proceeds from Step S26 to Step S22, to execute the processing of Step S22 and the subsequent steps.

On the other hand, the controller of the slave robot also executes the processing in Steps S48 through S60 repeatedly, and when the index i reaches the number of interpolation points, the procedure proceeds from Step S48 to Step S44, to execute the processing of Step S44 and the subsequent steps.

Thus, the controllers of the master robot and slave robot execute the above-described processing repeatedly as long as a new line is read from the master program and slave program. When a new line to be read becomes absent, the procedure for the master robot proceeds from Steps S23 to Step S35. Also, the procedure for the slave robot proceeds from Steps S45 to Step S61.

It is assumed that a new line to be read in the master program becomes absent for the master robot earlier than for the slave robot and the procedure of the processor of the master robot proceeds to Step S35 earlier than that of the slave robot. In this case, the processor of the master robot sends the latest position interpolation data determined in Step S28 and the synchronously cooperative operation start position data stored in the registers to the slave robot via the communication line L (Step S35), and determines whether or not the notices of completion have been sent from all the slave robots (Step S36). The processor of the master robot executes the processing of Steps S35 and S36 repeatedly until the notices of completion have been sent from all the slave robots, and continues to send the finally sent interpolation position data and synchronously cooperative operation start position data. Specifically, although the operation of the master robot is stopped, the finally sent interpolation position data and synchronously cooperative operation start position data are sent continuously to the slave robots.

On the other hand, the slave robot executes the processing of Steps S44 through S60 as long as a command line is read from the slave program. In this case, since the data received in Step S51 are the interpolation position data and synchronously cooperative operation start position data that were finally sent from the master robot, the transformation matrix determined by the processing in Step S54 is the same.

After the operation of the master robot is finished, the same correction (amount) is made for the slave robots (Step S55) to be controlled and driven based on the slave program. When a command line becomes absent in the slave program, the procedure for the slave robot proceeds to Step S61, where the notice of completion is issued to the master robot via the communication line, and then determines whether or not a completion command has been sent from the master robot (Step S62). If the completion command has not been sent, the stop confirmation and procedure is executed (Step S63). If a stop procedure command is not issued, the distance of motion of the latest line, determined in Step S46, is divided by the number of interpolation points, the quotient is multiplied by the number of interpolation points indicated by the index i, and the obtained value is added to the motion start position of the latest line to determine the interpolation position data (Step S63). Specifically, this interpolation position data is the final position, and is determined finally by the processing of Step S50 of the latest line. This data is the same as the interpolation position data stored in the register, so that it need not be determined by performing calculations again and can be obtained merely by reading the value stored in the register.

Then, the processing of Steps S65 through S72, which is the same as the processing in Steps S51 through S58, is executed. The interpolation position data determined in Step S64 is the same as the interpolation position data determined in Step S50 in the latest line, and for the transformation matrix determined in Step S68, the synchronously cooperative operation start position data and interpolation position data sent from the master robot are not changed. Therefore, this correction (amount) is the same as the correction (amount) determined finally in the latest line. As a result, the corrected interpolation position data determined in Step S69 is the same as the latest interpolation position data determined in Step S55 in the latest line. As a result, the motion amount (incremental amount) on each axis becomes "0", and no command is issued to the motor, so that the robot becomes stopped. The processing of Steps S61 through S72 is executed repeatedly until the completion command is sent from the master robot. When the completion command is sent from the master robot (Step S62), information indicating completion of the program is stored in the register P (Step S73) and the processing of the slave program terminates.

On the other hand, when the notices of completion are received from all the slave robots (Step S36), the processor of the master robot issues the completion command to all the slave robots (Step S37) and stores information indicating completion of the program in the register P (Step S38). Upon receipt of this completion command, the slave robot stops its operation, as described above and this processing for synchronously cooperative operation terminates.

In contrast with the above, when the slave robot finishes the processing of the slave program earlier than the master robot, the processor of the master robot executes the processing of Steps S22 through S34 repeatedly, and continues to send the synchronously cooperative operation start position and the interpolation position data to the slave robot at Step S29. The procedure for the slave robot proceeds from Step S45 to Step S61, and the processing in Steps S61 through S72 is executed repeatedly. In this case, the interpolation position data determined in Step S64 is, as described above, the latest interpolation position data in the latest line of the slave program and the final command position. For this interpolation position data, by the synchronously cooperative operation start position data and interpolation position data sent from the master robot, the interpolation position data corrected by using the transformation matrix determined in Step S68 is determined, and further the motion amount on each axis is determined, the acceleration/deceleration processing is performed, and the motor for each axis is driven (Steps S69 through S72).

Then, the execution of the master program is also completed and the procedure proceeds from Step S23 to Step S35. When the controller of the master robot receives the notice of completion from all the slave robot controllers (Step S36), it issues the notice of completion to all the slave robot controllers (Step S37), stores information indicating the termination of the program in the register P (Step S38), and stops the operation of the master robot. Upon receipt of the notice of completion (Step S62), the controller of the slave robot also stores information indicating the termination of the program in the register P (Step S72) and stops the operation of the slave robot.

Next, in the case where the normal programs are stored in respective robots, as shown in FIG. 6, the processing of Steps S1–S15 is executed.

Figure 15:
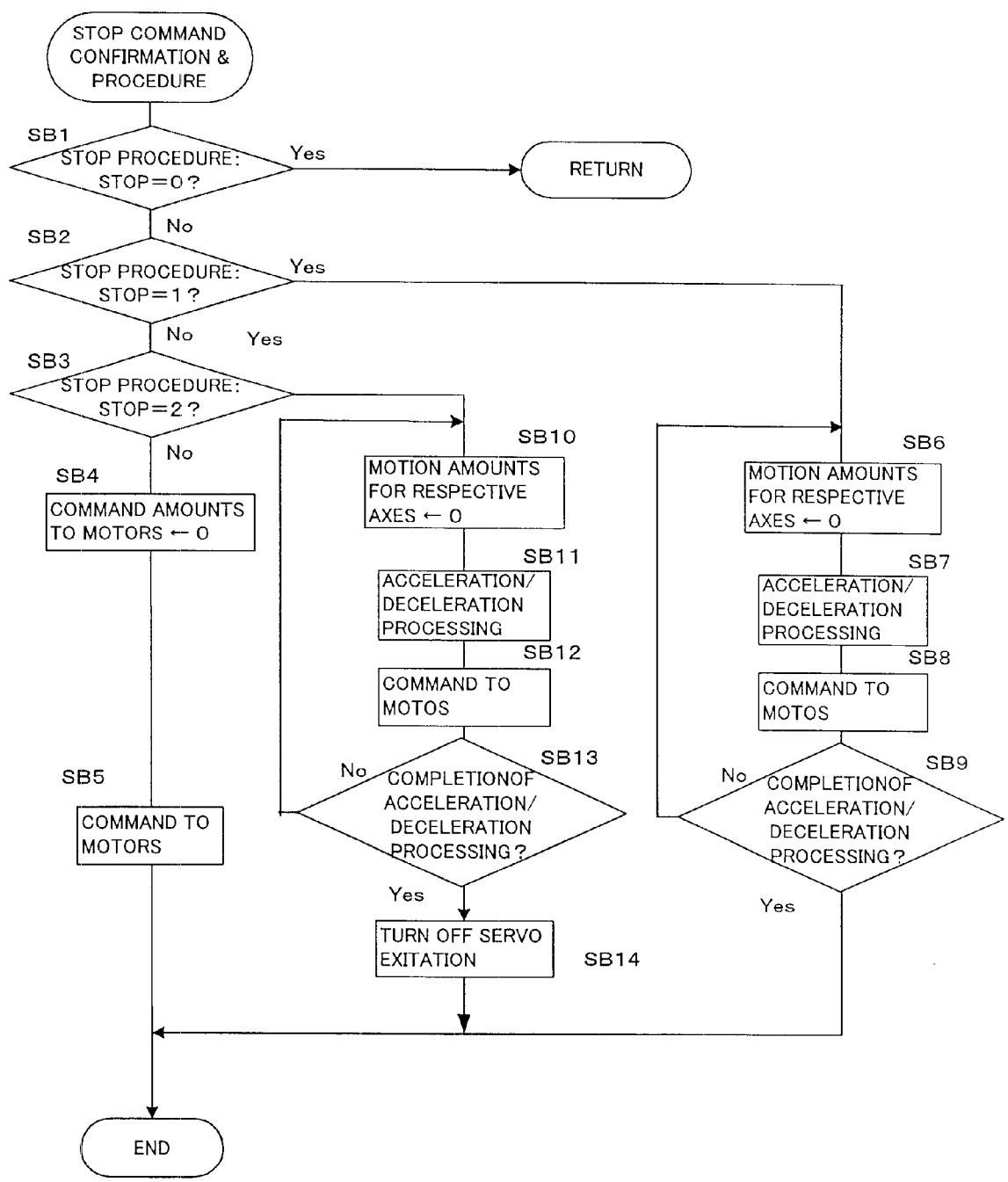
FIG. 15 is a flowchart of a subroutine "stop command confirmation & prosecution" in the above flowchart.

FIG. 15 shows the "stop procedure command confirmation and procedure" to be executed in Steps S9, S27, S49 and S63 as mentioned.

Figure 16:
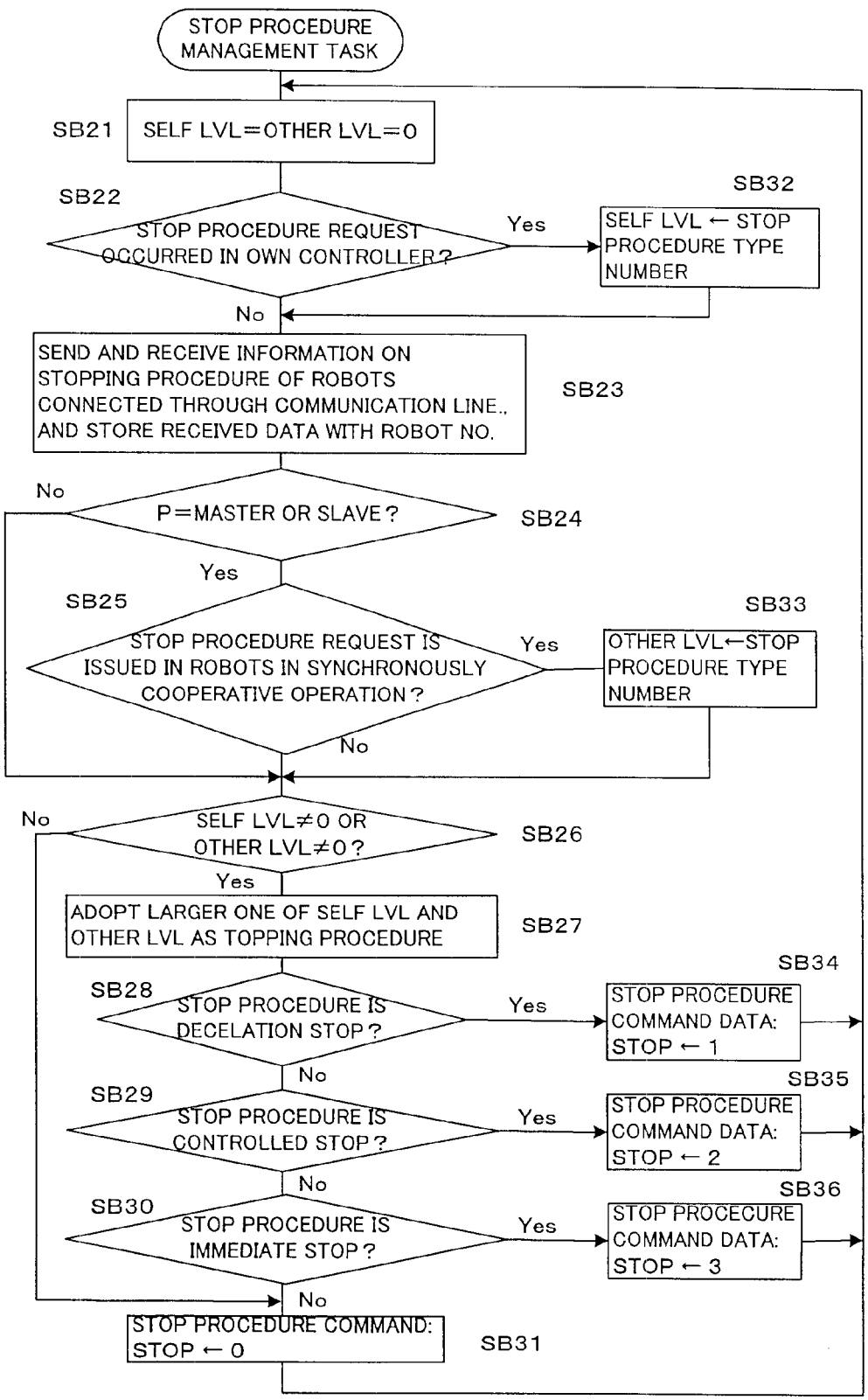
FIG. 16 is a flowchart of "stop procedure management task"

FIG. 16 shows a "stop procedure management task" for monitoring whether or not a stop command is issued and determining a stop procedure command. Each robot controller executes the monitor processing management task processing at every predetermined period. The processor 10 of the robot controller 1 initializes a register SELF LVL for storing the stop procedure type number for the robot connected with the robot controller and registers OTHER LVL for storing the stop procedure type numbers for the other robots connected through the communication line L, to "0" (Step SB21). The registers OTHER LVL are provided respectively for the robot controllers for the other robots.

Then, it is determined whether or not a stop procedure request (cause for stopping) is issued for the robot connected to the robot controller (Step SB22). If a stop procedure request (cause for stopping) is issued, the stop procedure type number for the cause for stopping (stop procedure request) is determined with reference to the setting of the designation of the stop procedure type number for each of the cause for stopping stored in the nonvolatile memory as shown in FIG. 8, and the determined stop procedure type number is stored in the register SELF LVL (Step SB32).

The stop procedure type numbers sent from the other robot controllers through the communication line L and the robot numbers associated with the other robot controllers are received and stored, and the stop procedure type number stored in the SELF LVL is sent to the other robot controllers (Step SB23). It is determined whether or not the operation program in execution is the master program or the slave program (Step SB 24). In the case where a normal program is presently in execution in the example as shown in FIG. 6, the determination result in Step SB24 is NO and the procedure proceeds to Step SB 26. In Step SB26, it is determined whether or not any one of the register SELF LVL and the registers OTHERS LVL stores a value other than "0". The register SELF LVL stores a value other than "0" when the stop procedure number is set in Step SB32 and stores "0" set in Step SB21 when a stop procedure request (a kind of cause for stopping) is not issued. In this case where the robot controller is in execution of a normal program, all of the registers OTHERS LVL store "0" since the processing of Steps SB 25 and SB33 is not executed. If all of the register SELF LVL and the registers OTHER LVL store "0", the procedure proceeds from Step SB26 to Step SB31 to set the stop procedure type command data STOP to "0". The setting of "0" in the stop procedure type command data STOP means not to execute any stop procedure, as describe later. If it is determined that any one of the register SELF LVL and the registers OTHER LVL store a number other than "0" in Step SB 26, the larger one of the numbers stored in the register SELF LVL and the registers OTHER LVL is adopted as the stop procedure type number (Step SB 27). In this case, since all of the registers OTHER LVL store "0", the stop procedure type for the robot is determined solely by the number stored in the register SELF LVL. It is determined whether the type of the stop procedure is the decelerating stop (the stop procedure type No. 1), the controlling stop (the stop procedure type No. 2) or the immediate stop (the stop procedure type No. 3) in Steps SB 28–30. The stop procedure command data STOP is set to "1" when the stop procedure type is determined as the decelerating stop, set to "2" when the stop procedure type is determined as the controlling stop and set to "3" when the stop procedure type is determined as the immediate stop (Steps SB 34, SB35 and SB36).

Thus, the stop procedure type number determined according to the cause for stopping occurred in the robot connected to the robot controller is set as the stop procedure command data STOP in the case where the robot controller is in execution of the normal program. Then the stop procedure of the determined type is executed in the "stop confirmation and processing" as shown in FIG. 15.

On the other hand, if it is determined that the robot controller is in execution of a master program or a slave program based on the information set in the resister P in Step SB 24, the procedure proceeds to Step SB25. In Step SB25, it is determined whether or not a stop procedure request (including the stop procedure type number) has been issued from any one of the robots performing the synchronously cooperative operation according to the master/slave robot definition as shown in FIG. 4. If it is determined that a stop procedure request has been issued from any one of the robots performing the synchronously cooperative operation, the stop procedure type number is set to the associated resister OTHER LVL (Step SB33) and the procedure proceeds to Step SB26. If a plurality of stop procedure requests are issued from the robots performing the synchronously cooperative operation, the stop procedure type numbers are set to the associated registers OTHER LVL, respectively. If a stop procedure type request has been issued from the robot not performing the synchronously cooperative operation, the procedure proceeds to Step SB26 omitting the processing of Step SB33.

Then, in Step SB26, it is determined whether any one of the register SELF LVL and the registers OTHER LVL store a number other than "0". If all of the registers store "0" the procedure proceeds to Step SB31, and any one of the registers stores a number other than "0", the largest one of the stored numbers is selected as the stop procedure type number (Step SB 27). Then, it is determined whether the stop procedure type number is "1 ", "2" or "3" and the determined number is set in the stop procedure command data STOP (Steps SB34, SB35 and SB36).

As described above, when the robot controller is in execution of a master program or a slave program, when a cause for stopping the robot occurs in any of the master robot and the slave robots performing the synchronously cooperative operation, the master robot and the slave robots are stopped in the same type of the stop procedure in synchronism. If different causes for stopping the robots occurs in the master and slave robots so that different stop procedure type numbers are set for the respective robots in the synchronously cooperative operation, the largest one of the stop procedure type numbers is adopted as the stop procedure type for respective robots in Step SB27. As described, since a larger number is assigned to a stop procedure type having higher degree of emergency, when the different stop procedure type numbers are set, the stop procedure type having the highest degree of emergency is adopted.

The "stop procedure command confirmation & processing" as shown in FIG. 15 is executed in Steps S9, S27, S49 and S63 in execution of a normal program, a master program and a slave program, as mentioned, to confirm an issuance of a stop procedure command and perform the stop procedure to stop the robot operation if a stop procedure command has been issued. First, the stop procedure command data STOP is discriminated (Steps SB1–SB3). If the data STOP is discriminated to be "0" (Step SB2), it means that a stop procedure command has not been issued and therefore the procedure returns to the main program. If the stop procedure command data STOP is discriminated to be "1" which represents the decelerating stop (Step SB2), motion amounts (incremental amounts) for respective axes of the robot are set to "0" and the acceleration/deceleration processing is performed to output the results of the processing to the motors until the processing is terminated, to decelerate the motors to be stopped (Steps SB6–SB9).

If the stop procedure command data STOP is discriminated to be "2" which represents the controlled stop (Step SB3), the motion amounts (incremental amounts) for the respective axes are set to "0" and the acceleration/deceleration processing is performed to output the results of the processing to the motors until the processing is terminated, to decelerate the motor to be stopped (Steps SB10–SB13), and further the power supply to the motor is shut down to turn off the servo excitation (Steps SB 14) to terminate the processing.

If the stop procedure command data STOP is discriminated to be none of "0 ", "1" and "2", namely it is discriminated to be "3" which represents the immediate stop,the command amounts to the motors are set to "0" to immediately stop the motors (Steps SB4, SB5).

As described, when a stop procedure command is issued in the master robot or the slave robots in the synchronously cooperative operation, the stop procedure of the type in accordance with the cause for stopping is selected and executed in the respective robot controllers. In the master robot controller, the processing of FIG. 15 is performed at Step S27 in execution of the master program to stop the motion of the master robot, and in the slave robot controller the processing of FIG. 15 is performed at Steps S49 and S63 in execution of the slave program to stop the operation of the slave robot.

When the robot controller executes a normal program, the processing of FIG. 15 is performed at Step S9 in execution of the normal program to stop the motion of the robot. In the foregoing embodiment, in the case where the stop procedure request is issued in any of the master and slave robots, the master and slave robots in synchronously cooperative operation are stopped, as described referring to Steps SB24, SB25 and SB33 in FIG. 16, and in the case where the stop procedure request is issued in the robot in performing the normal program, only the robot in performing the normal program is stopped.

However, in the robot control system having robot controllers connected with one another through the communication line, there is a case where it is preferable to stop some or all of the robots in the system in the same type of stop procedure when a cause for stopping occurs in one of the robots in the system, irrespective of the master and slave robots in synchronously cooperative operation.

In this case, the processing is modified by omitting the processing of Steps SB24, SB 25 and SB33, and the processing of Step SB23 is replaced by processing of storing the stop procedure type numbers into the registers OTHER LVL for the respective robots, and the procedure proceeds from Step SB23 to Step SB26 to execute the processing of Step SB26 and the subsequent Steps. If all of the registers SELF LVL and OTHER LVL store "0", the procedure proceeds to Step SB 31, and any of the registers SELF LVL and OTHER LVL store a number other than "0", the largest one of the stored numbers is selected and set as the stop procedure command data STOP. With this processing, when a cause for stop occurs in any of the robots connected to one another through the communication line, the stop procedures of the same type are performed in all of the robot controllers connected through the communication line to stop the operation of the robots.

Further, when a cause for stop occurs in one of the robots connected to one another through the communication line, any of the other robots to be stopped in the same type of stop procedure may be designated in advance. Particularly, a group of robots are designated and when a cause for stop occurs in any of the robots in the group, all of the robots in the group is stopped in the same type of stop procedure. In this case, in addition to the definition of the master and slave robots as shown in FIG. 4, a group of robots to be stopped in the same type of stop procedure are defined and stored using the robot numbers.

Then, in the stop processing managing task as shown in FIG. 16, the procedure of Step SB24 is deleted and the procedure proceeds from Step SB23 to Step SB25 where it is determined whether or not a stop procedure request is issued from a robot in the group to which the robot controller belongs. Only when the stop procedure command is issued from a robot in the group to which the robot controller belongs, the procedure proceeds to Step SB33 to store the stop procedure type number into the register OTHER LVL and the processing of Step SB26 and the subsequent processing are performed. With the above modification, when a stop procedure command is issued from a robot in the group to which the robot controller belongs, all of the robot in the group are stopped in the same stop procedure type. In the case of adopting this processing, when the robots to be operated in synchronous cooperation are set and inputted as the master and slave defining information, as shown in FIG. 4, the defined master and slave robots may be automatically set to be in the same group. In order to stop only the robots in synchronously cooperative operation in the same stop procedure type in synchronism, the processing of Step SB24 in the stop procedure managing task shown in FIG. 16 is necessary, but in order to stop the robot in the group when a stop causing matter occurs in any of the robots, irrespective of the synchronously cooperative operation, the processing of Step SB24 is omitted.

Further, in the foregoing embodiment, in Step SB23 in the stop procedure managing task shown in FIG. 16, the stop procedure type number is sent and received between the robot controllers connected through the communication lines. Alternatively, the cause of stop may be sent and received between the robot controllers in place of the stop procedure type number. In this case, the stop procedure type number is determined based on the received cause of stop using the set correspondence table of the cause of stop and the stop procedure type number as shown in FIG. 8.

Furthermore, the PLC may be provided on the robot control system in which the robot controllers are connected through the communication lines such as Ethernet, and the respective robot controllers and the PLC are connected by means of parallel I/O and the data relating to the position information for the synchronously cooperative operation are transmitted through the communication lines such as Ethernet and the data relating to the stop procedure may be transmitted through the parallel I/O.

Figures 17, 20A, 20B:
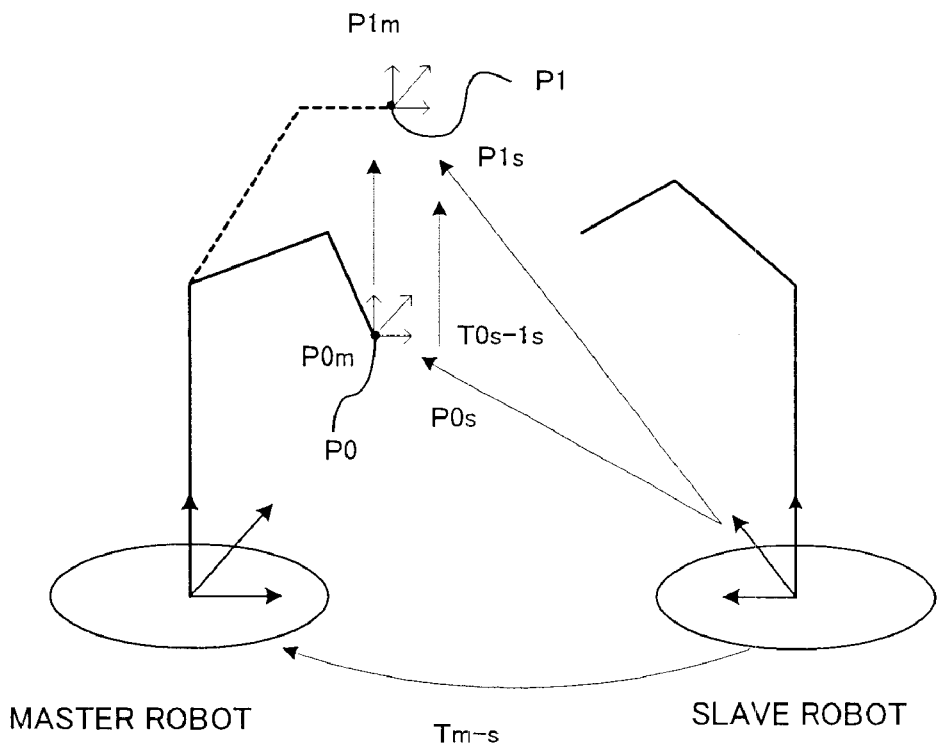
FIG. 17 is a schematic view of a method for determining interpolation position data of a slave robot on which the motion amount of a master robot is reflected.
FIGS. 20a and 20b are diagrams for showing examples of communication method to be adopted in the robot system as shown in FIGS. 18 and 19.

A case of independent input/output and a case of binary data input/output may be adopted as the method of transmitting the stop procedure information, as shown in FIGS. 20a and 20b.

In the case of the independent input/output, an input/output signal is assigned for each of the stop procedure type. For example, DO3 is outputted for stopping the robot in the immediate stop type, and D13 is inputted when the robot is to be stopped in the immediate stop type.

In the case of binary data input/output, each stop procedure type is expressed by binary data. For example, in the case of three stop procedure types, all the stop procedure types can be represented by two binary signals. In this case, two DO signals are outputted for stopping the robot in the immediate stop type and, two DI signals are inputted when the robot is to be stopped in the immediate stop type.

Figure 18:
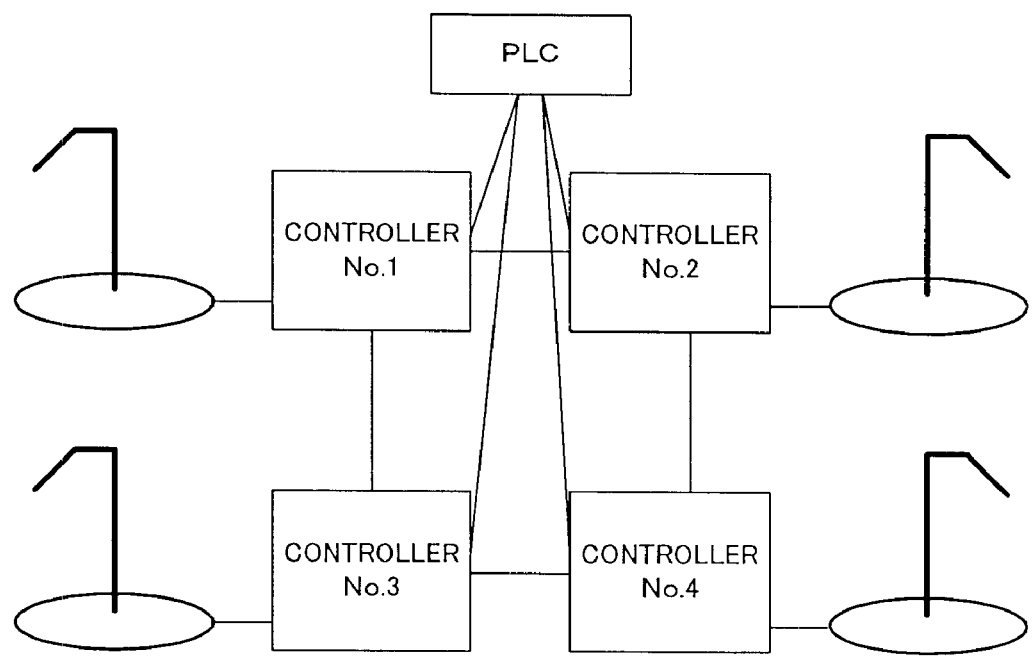
FIG. 18 is a schematic diagram showing a still another example of a robot system with a plurality of robots connected one another using a plurality of robot controllers.
Figure 19:
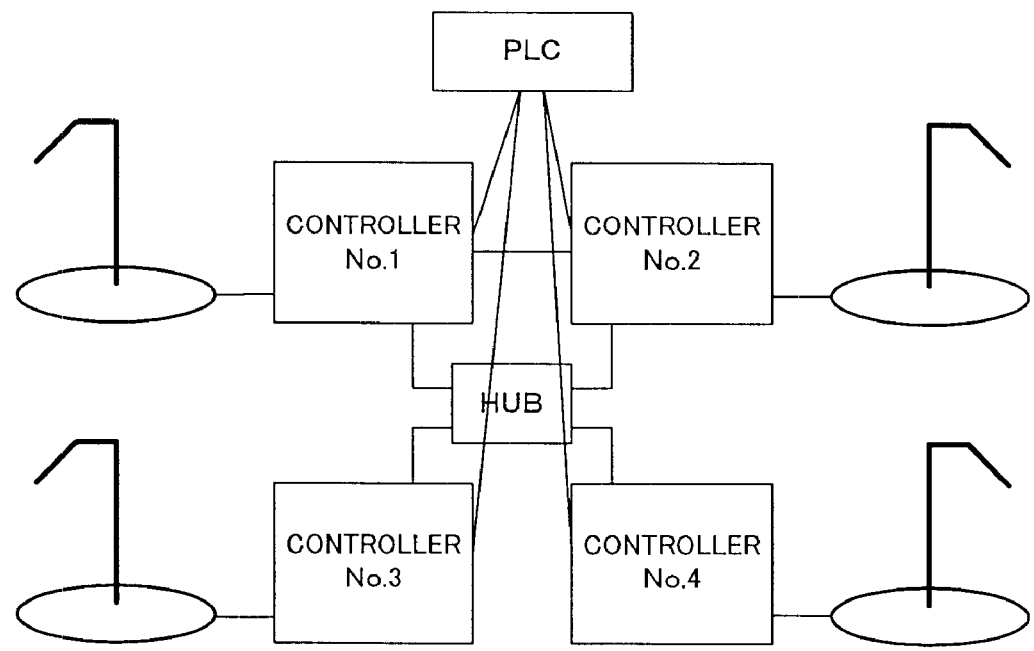
FIG. 19 is a schematic diagram showing a still another example of a robot system with a plurality of robots connected one another using a plurality of robot controllers.

In the robot control system shown in FIGS. 18 and 19, it is necessary for the PLC to input the stop procedure type signal from the robot controller to the other robot controllers as the stop command.

According to the present invention, when it is required to stop at least one of robots connected with one another through a communication path for a cause for stopping, the robot and the other robots are stopped in the same type of stopping procedure, to prevent relative displacement of relative positions between the robots in performing a synchronously cooperative operation. Since a deceleration stop and a controlled stop can be adopted as the stopping procedure types, frequency of an immediate stop conventionally adopted as the stopping procedure is lowered to reduce a load on a robot mechanism.

What is claimed is:

1. A robot controller for use in a robot control system in which a plurality of robot controllers each for controlling an associated robot are connected with one another through a communication path, said robot controller comprising:

storing means for storing assignment information on types of stopping procedure assigned for each of a plurality of causes for stopping the robot;

detecting means for detecting a first cause for stopping occurred in the robot associated with the robot controller;

designating means for designating a first type of stopping procedure based on the detected first cause for stopping and the assignment information stored in said storing means;

sending means for sending identification information on the designated first type of stop procedure to another robot controller through the communication path;

receiving means for receiving identification information on a second type of stop procedure sent from another robot controller through the communication path; and determining means for determining a type of the procedure of stopping the associated robot based on the identification information on the first type of stopping procedure or the identification information on the second type of stopping procedure.

2. A robot controller according to claim 1, further comprising means for sending and receiving information for performing a synchronized or cooperative operation through the communication path.

3. A robot controller according to claim 2, further comprising means for enabling said determining means only when the associated robot is in performing a synchronized or cooperative operation with another robot.

4. A robot controller according to claim 1, wherein said causes for stopping the robot include an emergency stop command inputted in the robot and an alarm occurred in the robot.

5. A robot controller according to claim 1, wherein said types of stopping procedure are classified by whether or not a power supply is shut off and/or whether or not motors for driving the robot are subjected to acceleration/deceleration processing.

6. A robot controller for use in a robot control system in which a plurality of robot controllers each for controlling an associated robot are connected with one another through a communication path, said robot controller comprising:

storing means for storing assignment information on types of stopping procedure assigned for each of a plurality of causes for stopping the robot;

detecting means for detecting a first cause for stopping occurred in the robot associated with the robot controller;

designating means for designating a first type of stopping procedure based on the detected first cause for stopping and the assignment information stored in said storing means;

sending means for sending identification information on the detected first cause for stopping to another robot controller through the communication path;

receiving means for receiving identification information on a second cause for stopping occurred in a robot associated with another robot controller sent from another robot controller through the communication path and designating a second type of stop procedure based on the assignment information stored in said storing means; and determining means for determining a type of the procedure of stopping the associated robot based on the identification information on the first type of stopping procedure or the identification information on the second type of stopping procedure.

7. A robot controller according to claim 6, further comprising means for sending and receiving information for performing a synchronized or cooperative operation through the communication path.

8. A robot controller according to claim 7, further comprising means for enabling said determining means only when the associated robot is in performing a synchronized or cooperative operation with another robot.

9. A robot controller according to claim 6, wherein said causes for stopping the robot include an emergency stop command inputted in the robot and an alarm occurred in the robot.

10. A robot controller according to claim 6, wherein said types of stopping procedure are classified by whether or not a power supply is shut off and/or whether or not motors for driving the robot are subjected to acceleration/deceleration processing.

11. A robot controller for use in a robot control system in which a plurality of robot controllers each for controlling an associated robot are connected with one another through a communication path, said robot controller comprising:

storing means for storing assignment information on types of stopping procedure assigned for each of a plurality of causes for stopping the robot;

detecting means for detecting a first cause for stopping occurred in the robot associated with the robot controller;

specifying means for specifying one or more other robots to be stopped simultaneously with the associated robot when the first cause occurs;

designating means for designating a first type of stopping procedure based on the detected first cause for stopping and the assignment information stored in said storing means;

sending means for sending identification information on the designated first type of stop procedure to the one or more other robot controllers of the specified one or more other robots through the communication path;

receiving means for receiving identification information on a second type of stop procedure sent from the one or more other robot controllers through the communication path; and determining means for determining a type of the procedure of stopping the associated robot based on the identification information on the first type of stopping procedure or the identification information on the second type of stopping procedure.

12. A robot controller according to claim 11, wherein said causes for stopping the robot include an emergency stop command inputted in the robot and an alarm occurred in the robot.

13. A robot controller according to claim 11, wherein said types of stopping procedure are classified by whether or not a power supply is shut off and/or whether or not motors for driving the robot are subjected to acceleration/deceleration processing.

14. A robot controller for use in a robot control system in which a plurality of robot controllers each for controlling an associated robot are connected with one another through a communication path, said robot controller comprising:

storing means for storing assignment information on types of stopping procedure assigned for each of a plurality of causes for stopping the robot;

detecting means for detecting a first cause for stopping occurred in the robot associated with the robot controller;

specifying means for specifying one or more other robots to be stopped simultaneously with the associated robot when the first cause occurs;

designating means for designating a first type of stopping procedure based on the detected first cause for stopping and the assignment information stored in said storing means;

sending means for sending identification information on the detected first cause for stopping to the one or more other robot controllers of the specified one or more other robots through the communication path;

receiving means for receiving identification information on a second cause for stopping occurred in the specified one or more robots sent from the one or more other robot controllers through the communication path and designating a second type of stop procedure based on the assignment information stored in said storing means; and determining means for determining a type of the procedure of stopping the associated robot based on the identification information on the first type of stopping procedure or the identification information on the second type of stopping procedure.

15. A robot controller according to claim 14, wherein said causes for stopping the robot include an emergency stop command inputted in the robot and an alarm occurred in the robot.

16. A robot controller according to claim 14, wherein said types of stopping procedure are classified by whether or not a power supply is shut off and/or whether or not motors for driving the robot are subjected to acceleration/deceleration processing.

* * * * *

UNITED STATES PATENT AND TRADEMARK OFFICE
CERTIFICATE OF CORRECTION

PATENT NO.  : 6,434,448 B1  Page 1 of 1
DATED       : August 13, 2002
INVENTOR(S) : Tetsuya Kosaka et al.

It is certified that error appears in the above-identified patent and that said Letters Patent is hereby corrected as shown below:

Column 2,
Line 42, after "operation" delete ".".

Column 4,
Line 3, change "fro" to -- for --.

Column 6,
Line 52, after "each" delete "-".

Column 8,
Line 32, change "=" to -- - --.

Column 9,
Line 39, "T0s" begins a new line.
Line 51, move "(4)" to the end of the line.
Line 55, change "=" to -- - --; move "(5)" to the end of the line.

Column 10,
Line 27, change "☐ 1" to -- ☐ 1 --.

Column 13,
Line 4, "If" begins a new paragraph.
Line 46, change "resister" to -- register --.

Column 15,
Line 34, change "is" to -- are --.

Signed and Sealed this

Seventh Day of January, 2003

JAMES E. ROGAN
*Director of the United States Patent and Trademark Office*